US008024373B2

(12) United States Patent
Bank et al.

(10) Patent No.: US 8,024,373 B2
(45) Date of Patent: Sep. 20, 2011

(54) COMPUTER-IMPLEMENTED SYSTEM FOR PRODUCING, PROCESSING AND MANAGING STRUCTURED DATA SETS

(75) Inventors: Marcel Bank, Oberrohrdordf (CH); Michael Engel, Zurich (CH)

(73) Assignee: UBS AG, Zurich (CH)

( * ) Notice: Subject to any disclaimer, the term of this patent is extended or adjusted under 35 U.S.C. 154(b) by 201 days.

(21) Appl. No.: 12/085,440

(22) PCT Filed: Nov. 23, 2006

(86) PCT No.: PCT/EP2006/011260
§ 371 (c)(1),
(2), (4) Date: Jan. 30, 2009

(87) PCT Pub. No.: WO2007/059977
PCT Pub. Date: May 31, 2007

(65) Prior Publication Data
US 2009/0171909 A1    Jul. 2, 2009

(30) Foreign Application Priority Data

Nov. 23, 2005    (EP) ...................................... 05025545

(51) Int. Cl.
*G06F 17/30*    (2006.01)
(52) U.S. Cl. ........................................ 707/803; 707/705
(58) Field of Classification Search .................. 707/705, 707/803
See application file for complete search history.

(56) References Cited

U.S. PATENT DOCUMENTS
7,630,986 B1 *  12/2009  Herz et al. ............................ 1/1
2003/0023539 A1   1/2003  Wilce et al.
2003/0050897 A1   3/2003  Altomare
2004/0215555 A1  10/2004  Kemper et al.

FOREIGN PATENT DOCUMENTS
EP            1 286 283       2/2003
WO       WO 03/042861        5/2003

OTHER PUBLICATIONS

R. Knecht, Application Architecture Framework UBS-WMBB, Integration and Management Day, May 2003, <URL: http://aim.iwi.unisg.ch/veranstaltungen/integrationDay/downloads/5_Knecht.pdf>.

(Continued)

*Primary Examiner* — Khanh Pham
*Assistant Examiner* — Johnese Johnson
(74) *Attorney, Agent, or Firm* — Finnegan, Henderson, Farabow, Garrett & Dunner, LLP

(57) ABSTRACT

According to one embodiment, a data management system has a basic function configurator to define a generic basic function, whereby the function to be performed is to be depicted in a basic function by means of descriptive attributes and associated values or value ranges necessary for processing the basic function. The function is to be depicted on a data set to which a distribution rule is allocated. A data set, with its associated distribution rules, defines a generic basic function. The data sets which define the generic basic functions, together with their distribution rules for access by a product template configurator, are contained in a basic function list. The product template configurator combines one or several basic functions and transfers these to a product template, in that the generic basic functions are mutated into specific basic functions for the product template concerned by transferring or restricting the values. A product template comprises one or more basic functions belonging to a product. A product template with specific basic functions serves as a basis for a contractual relationship with a partner. The structure of the product template is stored in a product template list for access by a contract manager.

22 Claims, 7 Drawing Sheets

OTHER PUBLICATIONS

International Search Report, mailed Feb. 15, 2007, for related International Application No. PCT/EP2006/011260 (3 pages).

European Search Report, dated Dec. 19, 2006, for related European Patent Application No. EP 06 02 4313 (4 pages).

* cited by examiner

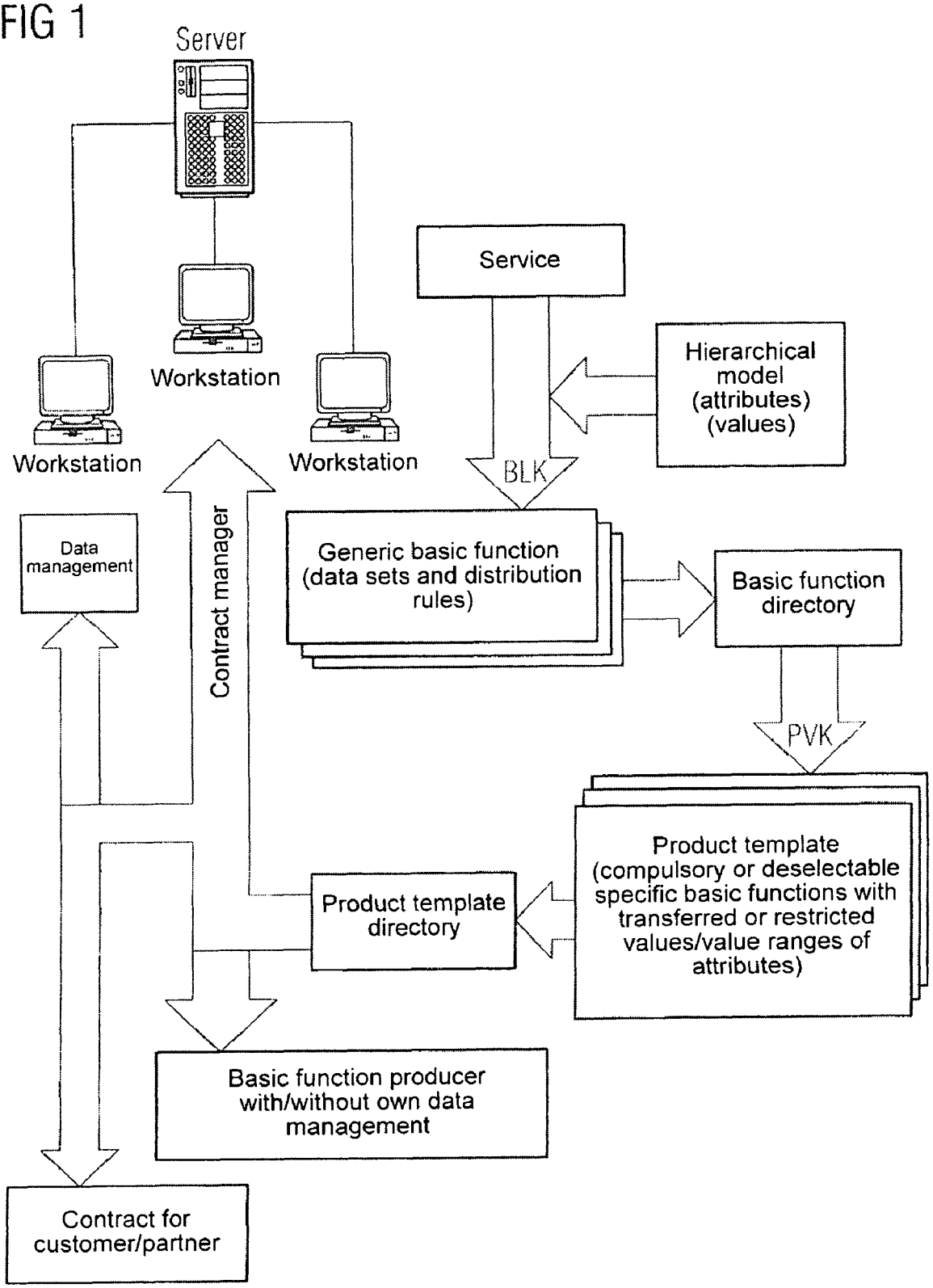

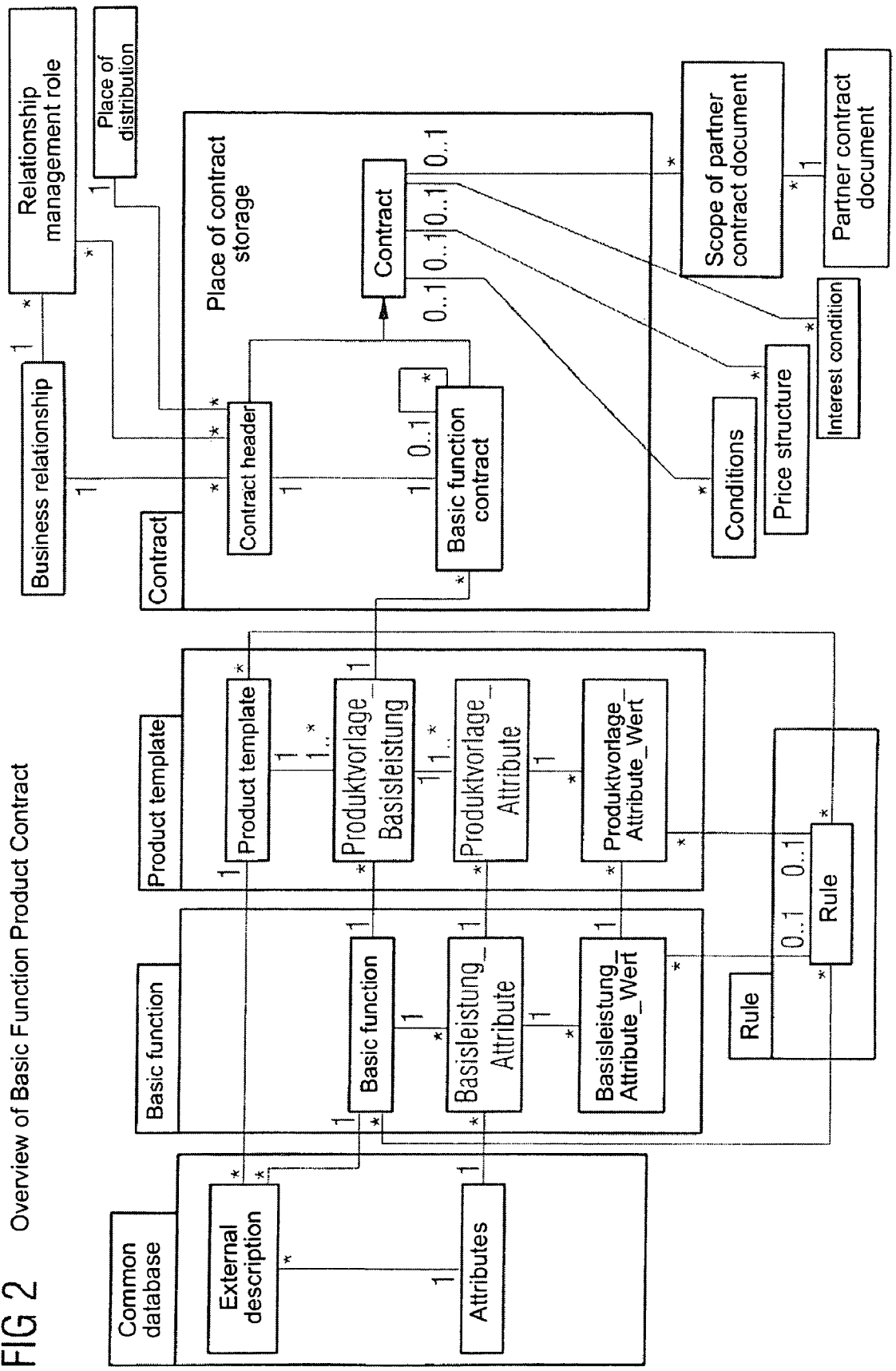
FIG 2  Overview of Basic Function Product Contract

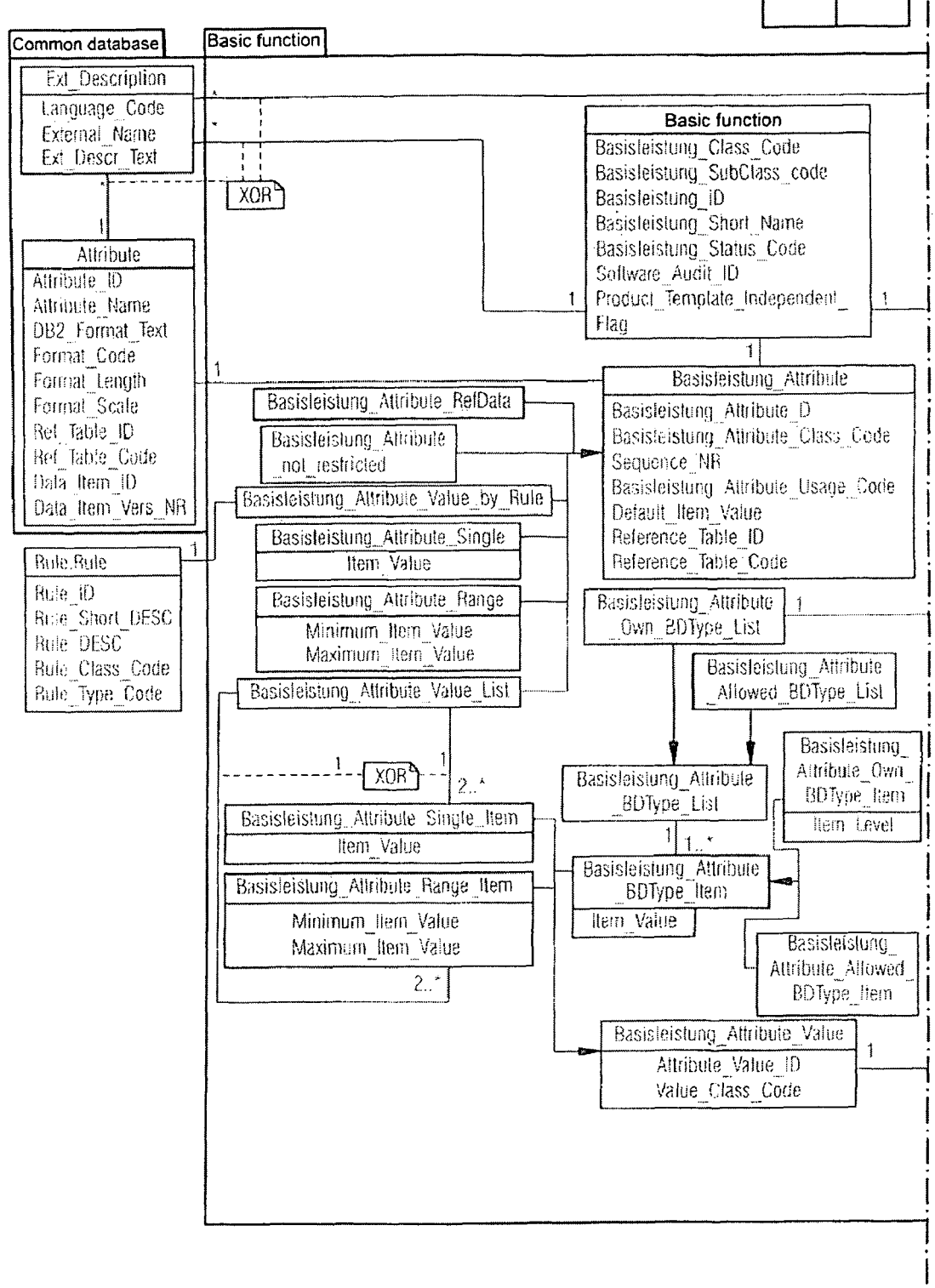
FIG 3A  Basic Function Product Template

COMPUTER-IMPLEMENTED SYSTEM FOR PRODUCING, PROCESSING AND MANAGING STRUCTURED DATA SETS

This application is a national stage filing under 35 U.S.C. §371 of International Application No. PCT/EP2006/011260, filed on Nov. 23, 2006, which claims priority to European (EP) Patent Application No. 05025545.4, filed on Nov. 23, 2005.

BACKGROUND

In many companies but also in authorities, today in connection with the performance of services, the establishment and performance of business relations or the performance of State tasks, huge quantities of data occur. A structured and systematic technical definition, production, processing, administration and presentation of the services performed, relationships concluded or similar are required. Only in this way can the backgrounds and details of the procedures connected with the data be reviewed at any time.

One example of a service provider are banks. In banking in recent years or even decades, there has been increasing differentiation of services and prices offered. Formerly uniform services (current account, deposit etc.) with few variants have been replaced by an ever increasing number of different services and price alternatives. The range of financial instruments offered becomes ever wider and the individual financing instruments are more customer-orientated and complex.

At the same time, the customer/partners on one side and the internal auditors and official authorities (supervisory authorities etc.) on the other, impose ever higher demands on the service provider in relation to transparency, consistency and completeness of data/information provided to the customer/partner by the service provider and which are produced and archived in connection with the business relationship.

When for example in a bank a 'product' is sold to a customer/partner, a contract is concluded. The contract establishes the agreements between bank and customer/partner, i.e. which rights and obligations are incumbent firstly on the bank and secondly on the customer/partner. As well as basic information, above all the individual features of the product are included.

One problem with the production, processing and administration of structured data sets, such as for example those which form contracts between bank customers and a bank, lies in that the bank firstly needs as many similarly structured products in its range as possible but secondly wants/needs to meet customer/partner wishes. More and more, the circumstance must be taken into account that customer advisors are not always informed of all possibilities and also restrictions which could be important in connection with a product. In addition, the bank's professional check of 'individually' agreed contracts can be extremely costly.

A second problem is that with conventional definition, production, processing and administration of products/contracts/services, the data maintenance cost incurred rises substantially as the individual agreements are difficult to store in comprehensible but simultaneously compact form.

Furthermore the typifying of products/contracts/services and their processing in conventional procedures is very difficult, which is reflected in rising data traffic and increased susceptibility to error with associated extra costs.

Finally the development of new products takes a relatively long time in conventional procedures. This is due in particular to rising standards of compliance with legal requirements, and the increased cost of implementation and testing in the complex IT environment of such service providers today, for example the bank or other organisation.

WO 03/042861 A2-D1 discloses a method and a device for computer-implemented production and administration of contracts. In particular a method and a device are known for computer-implemented administration of financing processes and in particular for production and administration of contracts in connection with financial services.

This publication describes the computer-supported production and administration of contracts between a supplier and a customer. The contracts comprise key data in a contract object product and one or more contract modules. To structure a contract, a selection is made of key data and contract modules, and the contract is produced on the basis of the selection made by generation and storage of so-called pointers to the selected key data and contract modules. First a selection of key data is made and then a selection of contract modules. On the basis of these selected key data, which contain information and rules on the product which is the object of the contract, the reliability of the selection of individual contract modules is checked.

This publication arose from the early evaluation phase of collaboration of the applicant of this document with international banks, including the applicant of the present invention. Consequently the information in this publication on how technical implementation could take place is vague and unspecified. The document explains namely at one point only that a selection of key data and a selection of contract modules is made, and that on the basis of the selection made the contract is generated by production and storage of so-called pointers to the selected key data and contract modules.

Document EP 1 286 283 A2 describes interface modules for performance of document-based electronic business processes on a transaction basis and a system for performance of electronic business processes on a transaction basis. Thus the performance of document-based electronic transactions between heterogenic systems is facilitated. An interface module comprises a module for display and monitoring of the useful data flow. This display and monitoring take place on a document basis. The transfer of the displayed useful data to and from a terminal can take place manually or automatically. The document templates can be entered into or modified in the file system of the interface module from a master server in the data network. On a change in configuration of interface module, parameters of processes concerned of work flows formed by means of document templates can be adapted automatically. The document templates and/or a complete workflow can be coupled by means of a mapping unit into a database with predetermined destinations in the data network.

The disclosed systems and methods provide a way of allowing, for a multiplicity of different types of products of a service provider for example a bank or other organisation, a structured and systematic definition, production, processing and administration of structured data sets such as those which describe the services and 'products' of a bank, at the level of electronic data.

SUMMARY

Accordingly, a computer-implemented system for data administration is provided, a computer-implemented system for production, processing and administration of structured data sets, where in this system is provided a basic function configurator in order to define at least one generic basic function, wherein at least one function performed or to be performed is to be depicted in a basic function according to a model organised preferably at least partly hierarchically by means of descriptive attributes and associated values or value ranges necessary for processing the basic function, and wherein the function performed or to be performed is depicted on one or more data sets, to each of which is allocated at least one distribution rule, and wherein one or more data sets together with the allocated distribution rules each define a generic basic function.

A list of basic functions is provided in which the data sets defining the generic basic functions together with their allocated distribution rules are stored in a structured manner as a database for access by a product template configurator.

The product template configurator is preferably intended to combine one or more basic functions from the database and transfer these to a product template, where the generic basic functions are mutated by transfer or restriction of values and/or value ranges for the attributes into specific basic functions for the product template concerned. A product template comprises one or more basic functions which must compulsorily belong to a product and can comprise one or more basic functions which are to be expressly added to or deselected from a product.

A product template with specific basic functions serves as the basis for a contractual relationship with a customer/partner. Also a product template list is provided in which the complete structure of the product templates is stored in a structured manner for access by a contract manager and for depiction on a graphic or alphanumeric user interface.

As different basic functions are defined in the computer system, with which a service (or a product) provided or to be provided can be depicted as whole, there is a high flexibility, countless different types of products/services can be depicted and implemented in a manner efficient for storage and programming in the IT system of the service provider, bank or other organisation. For example a basic function can define the service in its outer periphery while other basic functions can depict individual part aspects of the service.

Furthermore all basic functions already available and the products formed therefrom are available in the basic function list or product template list. This helps find existing basic functions/products and use or modify these as required instead of producing them again. Also methods consistent with the disclosed embodiments may include the use of standardised interfaces by the basic function supplier is required. This too simplifies programming and reduces the susceptibility to error. The clearly structured definition of the product templates and basic functions and the clear interface definition by the basic function producer, also reduce programming complexity and susceptibility to error.

Also explicitly formulated distribution rules provide better checkability, not least by internal auditors or (internal or external) supervisory authorities. Also (re-)use of basic functions and product templates already defined allows a shortening of the product development cycle for future basic functions and product templates. This is due not least to the technical consideration that the (re-)use of already tested (computer program) components with confirmed suitability in operation requires less cost in production and testing of new products when these available components are used. Also redundancies in new product definitions and rules are reduced.

The disclosed embodiments include using in the computer system an originating database machine which provides certain functionalities (for example account management, data processing functions) and data space (permitted value ranges of data) in order to produce and manage databases and their contents. The functionalities and data spaces of the originating database machine are set relatively wide in order to be adaptable to widely varying application situations and requirements in any destination IT landscapes.

From these functionalities, basic functions are produced adapted to a particular destination IT landscape and corresponding to the concrete circumstances in each case, in that data spaces and/or functionalities are restricted. The technical objective is to achieve a faster provision of new products but also to increase the later operating reliability of the databases and efficiency in processing their content.

The basic functions contain control information for bank-internal processing (for example cost calculation, reporting etc.). The functions of the basic functions are divided into part functions. Basic functions are defined by their properties, functions and value ranges.

A basic function contains no information on the bank-internal use and links to other basic functions and their functions; this use is defined by the linking of basic functions in the product template. All basic functions enriched in this way are set up in a common database (repository) and thus made available.

For product definition of a bank product, structural links or dependencies between such enriched basic functions are taken from the common database. Further restrictions of data space are made as specifically as possible for the desired bank product. These are product-specific usage rules of the product basic function included in the product definition of a bank product.

By proceeding in this way, financing products such as current accounts, deposits, safes and cards, but also other services can be depicted. Furthermore rights to use a particular communication channel such as E-banking can be established and controlled as service products provided by the bank. The time from the product idea to the finished product can be shortened substantially. This is possible thanks to the modules of "basic functions" and the modular product structure. Adaptations/modifications to existing products (for example new distribution rules, new interest conditions etc.) can be implemented quickly and easily. So-called "package" products, e.g. product definitions tailored to young bank customers or products with two accounts, or products in which one customer/partner retains his account for his "customer" life while prices and services are automatically controlled/defined depending on age and requirements of the customer/partner or further information, are easier to manage.

The distribution rules can comprise both static distribution rules and dynamic distribution rules. The use of dynamic distribution rules is advantageous for test or trial purposes.

The distribution rules can be defined by a rule identification number, a brief description, a long description, a rule class code and/or a rule type code.

The static distribution rules can be implemented as a computer program with standardised data input and/or output interfaces. The dynamic distribution rules can be implemented as a computer program with description and implementation of the dynamic rules and/or at least one dynamic variable as a computer program.

An expansion of the attributes by adding or expanding the value ranges may be excluded. Thus, ensuring that always basic functions or products are defined which can be processed by the system according to the invention without errors for example due to exceeding of ranges or other conflict situations.

Furthermore referenced conditions can be provided such as central instructions, price specifications, interest terms, which supplement a product template. A referenced condition can overrule values and/or value ranges for the attributes, wherein each referenced condition has its own rule set and its own class code.

The distribution rules determine which conditions must be fulfilled in order for a customer/partner to be given access to a product with the basic function concerned.

The distribution rules can comprise age, domicile, customer segment and/or legal restrictions. The distribution rules cannot be overwritten.

The distribution rules with legal restrictions must compulsorily be included in the product configuration. An identification number characterising the distribution rule can be allocated to the product template.

To check whether values or ranges of attributes are observed or whether inputs in the fields are correct in relation to the field format concerned, validation rules can be provided.

The validation rules can indicate on checking whether values or ranges of attributes are observed or whether field formats are correct, giving as a result "OK/NOK".

To make a pre-selection and check of product templates for which a contract relationship is to be opened/modified for a customer/partner, and which when checked return a result set, one or more validation rules can be provided.

One or more validation rules can be provided to determine a customer-/partner-specific setting before or during depiction on a graphic or alphanumeric user interface.

One or more validation rules can be provided to check observation of a value or value range or a data set to ensure the processability of a basic function, wherein the values/value ranges/data sets to be checked are specified in the product template concerned.

The segmenting of the service into several basic functions can take place on the basis of delimitable functions in the service to be performed.

Starting from the "generic" product or service thus provided, in contract conclusion a concrete and individualised agreement is reached between the service provider (for example the bank) and the customer/partner.

For this a computer software program component contract manager is provided in order to retrieve from a product template list, in which the structures of the product templates are stored in a structured manner, a product template for individualisation and supplement this specifically in that either at least one preset value is transferred or a value within a permitted range is selected in order to produce an individualised contract document reflecting the contract and trigger the saving of this contract in a database and its technical processing. Thus the contract has a contract header and at least one basic function derived from the product template. From each basic function included in the contract, a basic function contract is derived from which for each basic function producer predetermined basic function contract data are transferred. For producers with their own data management, in the contract the basic function contract data are shown as a key and for producers without their own data management, these basic function contract data are stored in the contract. The software program component contract provides functionalities for managing the contract data available and manages all customer-/partner-relevant customer contracts.

In other words, a contract is based on a product template which the customer advisor specifically supplements in consultation with the customer/partner. Here either the pre-set value (default) is used or a value within the permitted range is selected individually for the customer/partner. Conclusion of the contract, i.e. the sale of a product, triggers two main activities on the side of the service provider (bank). Firstly a physical contract document is produced which is usually signed by both parties and given to the customer/partner. Secondly storage of a contract in the (bank) internal data processing and the technical processing of the contract are triggered.

In one embodiment, the contract consists of a contract header and at least one basic function. The basis for the contract is the completed product template i.e. the product sold. From the product template the contract header is derived and from each basic function included in the contract, a basic function contract is produced. The basic functions can have different origins. Depending on origin of the basic function i.e. depending on the identity of the basic function producer, different basic function contract data are contained in the contract. Basic functions from particular producers with their own data management are shown in the contract merely as a key. The actual basic function contract is passed onto the producer of the basic function.

Producers without their own data management simply store their basic function in a separate database. This basic function contract data are stored in the contract. Information on pricing, instructions and even interest do not appear in the contract. Storage and retrieval take place directly via the corresponding software program component. An extract from the most important contract data is replicated in a contract directory which is available as a reference directory.

The software program component contract manages and administers all customer-/partner-relevant customer contracts. The software program component contract provides services for definition of the contract data. In relation to third party software program components, the contract-specific functionalities/services are always retrieved by a software program component contract manager and never directly. One condition for opening a contract is the presence of a partner or corresponding business relationship. Each contract must consequently be able to be allocated directly to a business relationship or a partner. The contracts are always defined by the software program component contract manager. The basis for opening a contract is the product template. The product template specifies all necessary information such as value ranges, defaults, compulsory and optional fields for conclusion of a contract. The individual features of a sold product, defined on the basis of the defaults in the product template, are depicted in the contract. The contract consequently is based in structure and content on the product template i.e. each contract refers to a corresponding product template.

The contract header is derived from the product template and forms the envelope for the basic function contracts belonging to the contract. The contract header contains different keys (product template ID and contract header ID). In addition further information such as for example lifecycle information (status, opening date etc.) are contained in the contract header.

The basic function contract is based on the basic functions defined in the product template. On the basis of the different basic function types or producers, the basic function contracts differ in scope of information contained in the contract.

Basic function producers with their own data management, to process their transactions, have their own physical data representation (i.e. table/data model) of their basic functions. In this case the contract data of the basic function contract is fully contained in the data records of the basic function producer.

On contract conclusion the complete basic function contract is transmitted via an interface to the corresponding basic function producer who stores the data accordingly in his database component.

The contract itself contains only references (keys) which point to the corresponding basic function producer or holder of the basic function contract.

For basic function producers with separate data management, software program components are used which do not contain their own physical representation of the basic function but store this completely in the product. On contract conclusion the complete basic function contract is stored in the contract; depending on origin of the basic function, the basic function contract may be only partially depicted.

'References' are for example prices, instructions and interest. These are not stored in the contract even as references (keys). The prices, instructions and interests belonging to a contract must be determined by corresponding querying of the software program component containing the data.

In one embodiment, a computer program product is provided which is designed to implement a system when processed by a computer or computer network. The computer program product can for example be stored on a computer-legible magnetic or optical information carrier (such as a CD ROM).

BRIEF DESCRIPTION OF THE DRAWINGS

Several embodiments are explained in more detail below with reference to the enclosed drawings.

FIG. 1 shows diagrammatically a computer system and the computer program components present in the computer system and their interaction.

FIG. 2 shows diagrammatically the correlation between basic function, product template and contract.

DETAILED DESCRIPTION

Figure 3B:
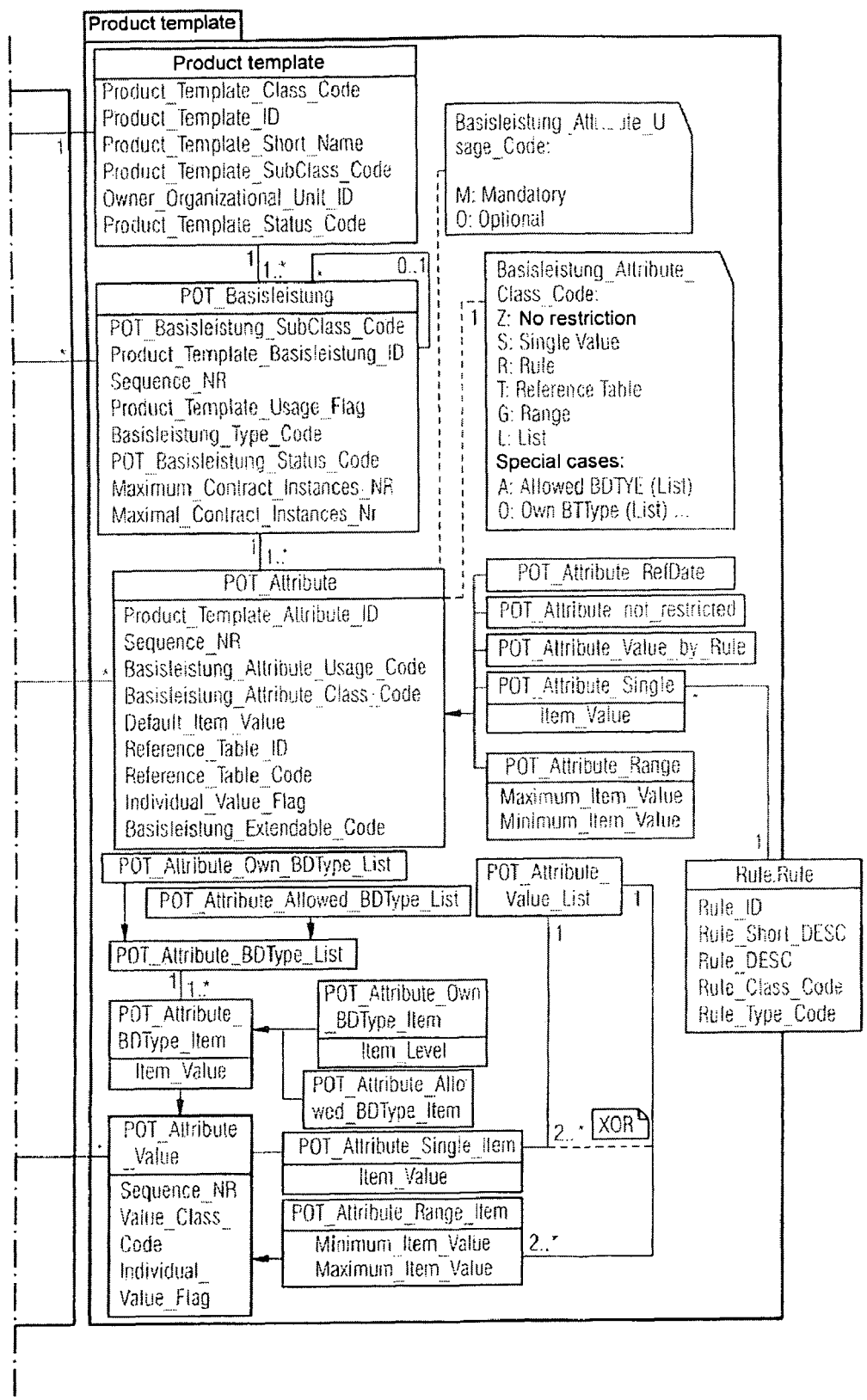
FIG. 3 shows diagrammatically the processing of rules by the software program component contract manager.
Figure 4:
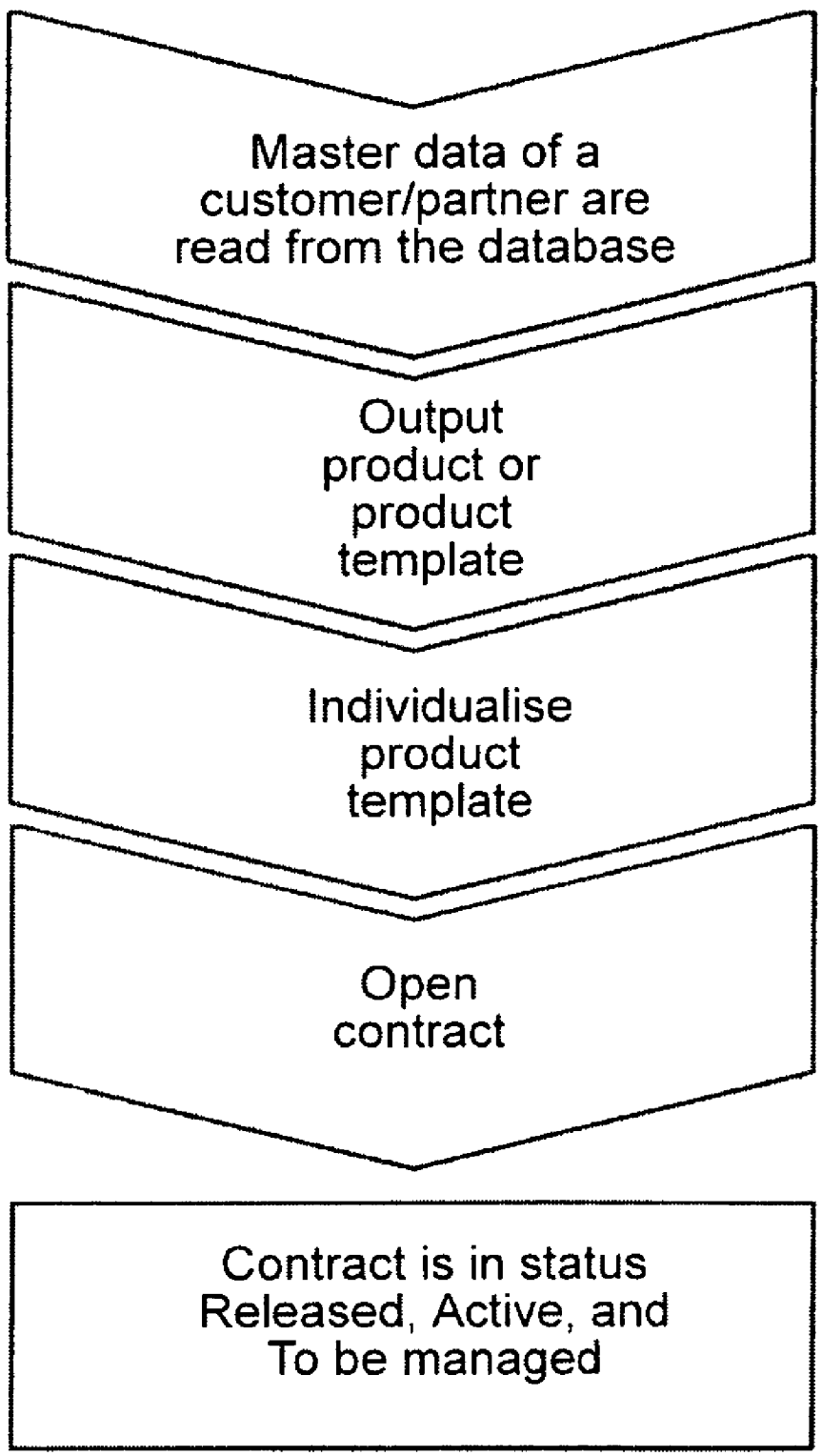
FIG. 4 shows diagrammatically how a contract is produced from a product template.

FIG. 1 shows a computer-implemented system for producing, processing and managing structured data sets. This system has one or more servers for data and/or program management and a multiplicity of workstations which are connected with the server for data or program exchange. In this system a computer software program component basic function configurator BLK is provided. The basic function configurator BLK serves to define a generic basic function. A generic basic function depicts at least one function performed or to be performed according to a hierarchical organised model. For this by means of descriptive attributes and associated values or value ranges necessary for processing the basic function, the generic basic function is structured and depicted on one or more data sets, to each of which is allocated at least one distribution rule. The data sets together with the allocated distribution rules each define a generic basic function.

Furthermore a basic function directory BL-DICT is provided in which the data sets defining the generic basic functions together with their associated distribution rules are stored in a structured manner as a database for access by a computer software program component product template configurator.

The product template configurator PVK is intended to combine one or more basic functions from the database in the basic function directory and transfer these into a product template POT, in that the generic basic functions are mutated into specific basic functions for the product template concerned by transfer or restriction of values and/or value ranges for the attributes. For this a product template POT comprises one or more basic functions which compulsorily belong to a product. It can also comprise one or more basic functions to be expressly added to or deselected from a product.

The product templates are stored in a product template directory. Here the complete structure of the product templates is stored in a structured manner for access by a computer software program component contract manager and depiction on a graphic or alphanumeric user interface GUI.

In order to retrieve and specifically supplement a product template for individualisation from the product template directory in which the structures of the product templates are stored, by means of the contract manager either at least one preset value must be taken or a value selected within a permitted range. In other words the permitted range is (further) restricted. Thus an individualised contract document reflecting the contract is produced, and the storage of this contract in a database and its technical processing are triggered.

The contract comprises a contract header and at least one basic function derived from the product template. From each basic function included in the contract a basic function contract is derived, from which predetermined basic function contract data are transmitted to the respective basic function producer. For producers with their own data management, in the contract the basic function contract data are kept as a key and for producers without their own data management, these basic function contract data are stored in the contract. The software program component contract manager provides functionalities for defining the contract data available and manages and administers all customer-/partner-relevant customer contracts.

FIG. 2 shows the correlation and relationships between basic function(s), rule(s), product template(s) and contract in further detail.

A data structure of a basic function consistent with a disclosed embodiment can have the following structure (see FIG. 3):

| Class: | |
|---|---|
| Attribute | |
| Attribut_Directory | Directory of all attributes with which basic functions and/or rules are defined. |
| Attribute: | |
| DB2_Format_Text | Physical DB2 format of the attribute |
| Attribute_ID | Standard identifier of an attribute which is used in a basic function, rule or similar |

-continued

| | |
|---|---|
| Attribute_Name | Name of the attribute which is used in a basic function, rule or similar |
| Physical_Format_Text | Physical DB2 format, e.g. SMALINT, CHAR (16) |
| Format_Code | Format of defined attribute. Code list<br>C Code<br>D Date<br>I Identifier<br>N Number<br>Q Quantity<br>T Text |
| Format_Length | Total length of field (inc. decimal places) for use in a basic function, rule or similar |
| Format_Scale | Decimal places for data type Decimal (otherwise zero) for use in a basic function, rule or similar |
| Reference_Table_ID | Id of reference table. May only be filled if the attribute has FORMAT_CODE = "C" (code) e.g. CNTRY<br>R10000 |
| Reference_Table_Code | Code number of code table (e.g. code number contains Ref_Table R10001)<br>Only filled if field REFERENCE_TABLE_ID is filled with value "R10000". |
| Data_Item_ID | External key to data item catalogue |
| Data_Item_Version_NR | Version of referenced data item from data item catalogue basic function |

Class:

| | |
|---|---|
| Basic function | Basic functions available for definition of products from |

Attribute:

| | |
|---|---|
| Basisleistung_ID | Technical STID of a basic function |
| Basisleistung_Short_Name | Short name of basic function for searching. The short name is a unique, alternative search key |
| Basisleistung_Status_Code | Status of basic function; to form products, only basic functions of status = 2 (productive) may be used.<br>Code list<br>1 Development<br>2 Production<br>3 Out of service |
| Software_Audit_ID | The ID of the physical instance of the software sub-component (see I-SAC), supplier of basic function from other software program components. Example: "HQE: Card Lifecycle Data" |
| Product_Template_Independent_Flag | Identifies whether the basic function can be used as an independent basic function<br>0 = No (can only be used as allocated or service basic function)<br>1 = Yes (also possible as independent service basic function) |
| Basisleistung_Class_Code | Defines whether a basic function is attached to the contract header or the basic function contract<br>Code list<br>BL Basic function<br>CH Contract header |

Class:

| | |
|---|---|
| Basisleistungs_Attribute | Attribute used in a basic function |

Child Class:

Basisleistung_Attribute_not_restricted
Basisleistung_Attribute_Range
Basisleistung_Attribute_Single
Basisleistung_Attribute_Wert_By_Regel
Basisleistung_Attribute_Wert_List -continued Attribute:

| | |
|---|---|
| Basisleistung_Attribute_ID | Standard identifier of an attribute which is used in a basic function |
| Sequence_NR | Serial number of the attribute in a basic function |
| Basisleistung_Attribute_Class_Code | Defines the restriction of the value range of an attribute in a basic function<br>Example:<br>L: Only values from the attribute list are valid<br>G: Values within a range are valid<br>R: Valid values are defined by a rule<br>Code list<br>F fixed<br>N not restricted<br>R restricted |
| Basisleistung_Attribute_Usage_Code | Establishes whether the attribute is optional or mandatory in a product template. Coex is a special case of mandatory<br>Code list<br>C COEX<br>M Mandatory<br>O Optional |
| Default_Item_Wert | Default value of an attribute used in a basic function, rule or similar |
| Reference_Table_ID | Id of reference table. May only be filled for an attribute with FORMAT_CODE = "C" (code) e.g. CNTRY R10000 |
| Reference_Table_Code | Code number of code table (e.g. code number within Ref_Table; is only filled if field REFERENCE_TABLE_ID contains value "R10000'. |

Class:

| | |
|---|---|
| Basisleistung_Attribute_not_restricted | Attribute used in a basic function, the valid values of which are not restricted, i.e. all values in class "Attribute" are permitted.<br>Corresponds to attribute class code = "Z" |

Parent Class:

Basisleistung_Attribute
Attribute:
Basisleistung_Attribute_not_restricted:

| | |
|---|---|
| Basisleistung_Attribute_Wert_List | Attribute used in a basic function, the valid values of which are established individually by a list of values and/or ranges.<br>Corresponds to attribute class code = "L" |

Class:

Basisleistung_Attribute_Value
Parent_Class:

Basisleistung_Attribute
BL_Attribute_Value | Valid individual value or value range of an attribute used within a product template Class
Child_Class:

Basisleistung_Attribute_Range_Item
Basisleistung_Attribute_Single_Item

| | |
|---|---|
| Value_Class_Code_Attribut | Defines the type of a concrete value within a value list |
| Attribute_Wert_ID_Attribut_Datastandard | Unique identification of an attribute value or value range for use in a basic function, rule or similar |

-continued

| | |
|---|---|
| Basisleistung_Attribute_Single_Item | Valid individual value of an attribute class used in a basic function |
| Parent Class: | |
| Basisleistung_Attribute_Wert | |
| Attribute: | |
| Item_Wert | Valid individual value |
| Basisleistung_Attribute_Wert_By_Regel | Attribute used in a basic function, the value of which is firmly defined by a rule. Corresponds to attribute value class code = "R" |
| Class: | |
| Parent_Class: | |
| Basisleistung_Attribute | |
| FK_Regel_ID (Regel) | |
| Attribute: | |
| Datastandard: | Reference (STID) of a rule which context-dependent determines the value of the attribute |
| Class: | |
| Basisleistung_Attribute_Wert_By_Regel | |
| Basisleistung_Attribute_Range | |
| BL_Attribute_Wert_Range | Valid value range of an attribute class used in a basic function |
| Parent_Class: | |
| Basisleistung_Attribute | |
| Attribute: | |
| Minimum_Item_Wert | Minimum value of the value range |
| Maximum_Item_Wert | Maximum value of the value range |
| Basisleistung_Attribute_Range_Item | Valid value range of an attribute class used in a basic function |
| Parent Class: | |
| Basisleistung_Attribute_Value Attribut: | |
| Minimum_Item_Value | Minimum value of the value range |
| Maximum_Item_Value | Maximum value of the value range |
| Basisleistung_Attribute_Single | Attribute used in a basic function, the value of which is firmly defined by a value (value). Corresponds to basic function attribute class code = "S" |
| Class: | |
| Parent_Class: | |
| Basisleistung_Attribute | |
| Attribute: | |
| Item_Value | Valid individual value |
| Basisleistung_Attribute_Value | Valid individual value or value range of an attribute used in a product template |
| Class: | |
| Datastandard: | |
| Attribute: | |
| Basisleistung_Attribute_Value | |
| Class | |
| Rule | |
| Child_Class | Dynamic Rule |
| | Static_Rule |
| Attribute: | |
| Rule_.ID | |
| Rule_Short._DESC | Brief designation of a rule |
| Rule_DESC | Detailed description of a rule |
| Rule Class Code | Defines whether it is a dynamic or a static rule Code list D Dynamic S Static |

| | |
|---|---|
| Rule_Type_Code | States what type of rule is concerned: Eligibility rule (distribution rule), Validation rule, or Attribute rule (valid value, default, etc.) Code list A Attribute rule E Eligibility rule V Validation rule |
| Class: | |
| External_Description | Language-dependent descriptions (name, definition) of attributes, basic functions, products and rules |
| Attribute: | |
| Language_Code | Language (in ISO format) Code list de German en English es Spanish fr French it Italian pt Portuguese |
| External_Name | External name of an attribute, in the given language, of a basic function, a product or a rule, which e.g. is used to label the graphic user interfaces (GUIs). |
| External_Description_Text | Description of an attribute, in the given language, of a basic function, a product or a rule. |

A product is produced from one or more basic functions. For this a basic function directory (BL-DICT) contains basic functions (BL) from providers/business areas with the following states:

Basic function released and active for product configuration

Basic function released and inactive for product configuration

Basic function not released and inactive for product configuration (no more contracts may be issued).

The steps are described below with which a product is configured, in that a product template (POT) is produced (or an existing product template (POT) re-used in the manner of a template):

Define product template (short text, long text, identifier, status etc)

Import one or more basic functions from the basic function directory (BL-DICT)

Basic function must be released and active

Basic function is instanced as a product template basic function

On the product template basic function (POT-BL) the following actions are performed:

Its status is changed to "in processing"

Rules are defined for the product template basic function

Define permitted business case types (a basic function can have several business cases, for example basic function Account has business case types Monthly statement, Intermediate statement or Annual statement)

Establish or restrict attribute value ranges (within the permitted values of the basic function)

Establish default values of the attributes.

When creating a product template from one or more basic functions, the status of the basic functions included is set at that which is productive at the time of production of the product template. This is irrespective of whether or not adaptations are made to the basic functions in the product template. This referencing applies until the next explicit mutation of the product template. Consequently there are no "sliding" or automatic updates of product templates.

A check function is provided in order if necessary to detect those product templates which use basic functions that are mutated after production or the last mutation of the product template. On the basis of this it must be checked whether the product template concerned can continue to be used sensibly. In particular individualisation of basic functions in a product template and the allocation of rules to a product template must be checked. If a product template is brought to the latest state of the basic functions contained therein, an explicit mutation to the header data of the product template is required. For this an entry is made on the existing product template ID with the current time stamp.

Figure 5:
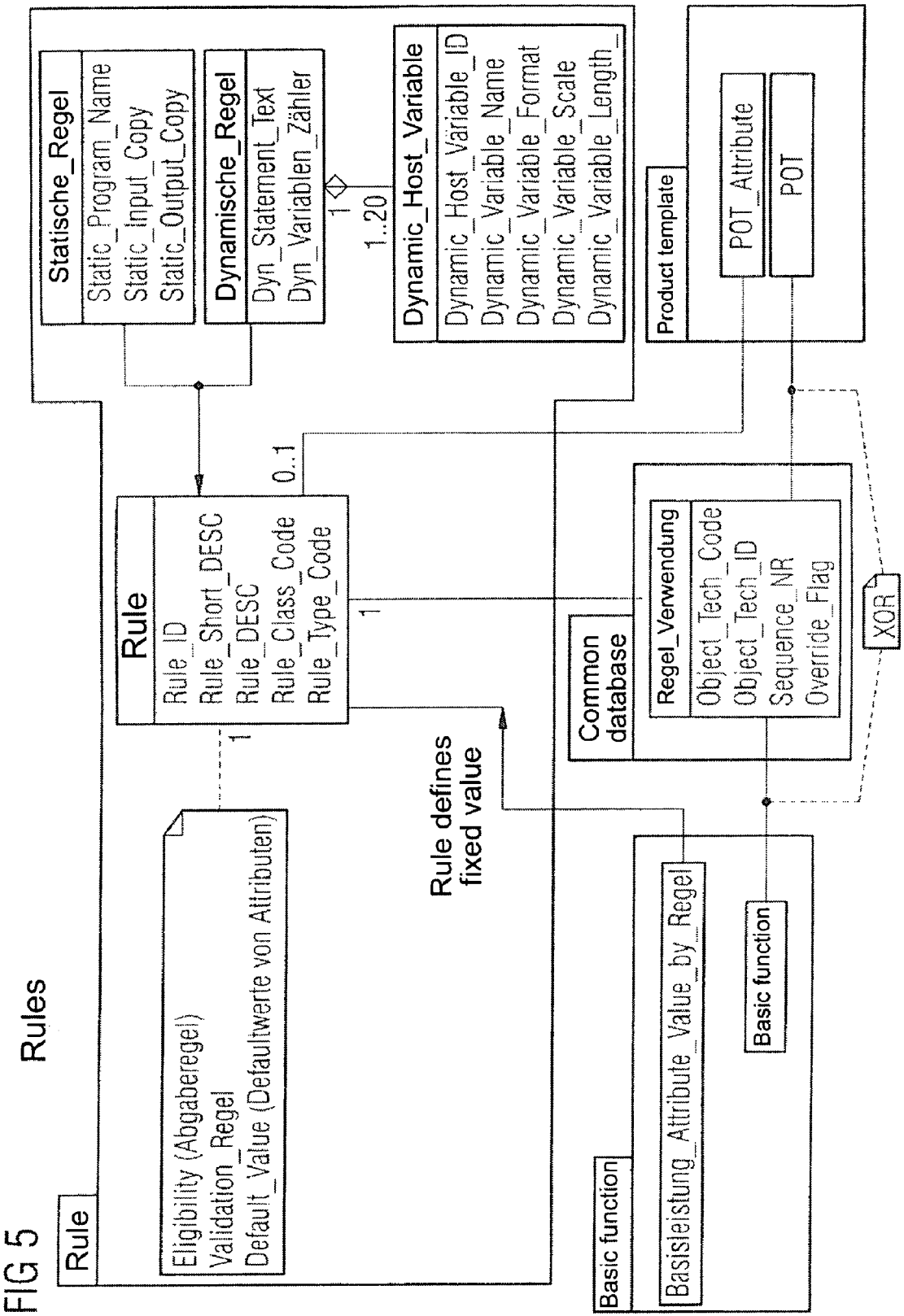
FIG. 5 shows diagrammatically the structure of rules and their interaction with the basic functions and product templates.

From a product template a contract is produced by the following actions being performed (see FIG. 5):

The master data of a customer/partner are read from the corresponding database.

Check for products suitable or permitted for the customer/partner

Issue of the product list of all suitable/permitted products

The associated product template is read.

Input: product template ID and partner ID

Checking of distribution rules

Output of product or product template on the graphic/alphanumeric user interface Individualisation of product template in that Attributes are adapted within the possible value ranges Open contract by Checking distribution rules Creating the business case "Open contract" in the database of the bank The contract is entered in the software program component "Contract" and in the contract directory
Any instructions and redemptions are applied
Corresponding software program components are added
The software program components "Price structure" and the attribute derivation (for account products) receive messages with partial or complete data on the contract In the formation of a contract, the metadata of the basic functions and product templates are accessed. On the basis of this information it is known which software program components or business subsystems/solution areas can or must be involved in the contract concerned. It is also known by means of which attributes/interfaces data can be exchanged by the corresponding components.

The metadata of the basic function, in particular the basic function contained in a product template, contains in addition to the structural data also permitted value ranges of the basic function attributes. These value ranges are usually established by the corresponding software program components and describe the permitted values. The value ranges can be quite complex even in basic function definition e.g. combinations from lists of individual values and value ranges can be depicted. This also applies to references to other tables e.g. reference data. From the aspect of the individual attribute they are static value ranges which may not be adequate, for example if a value range is given for an attribute which is defined by means of a data-dependent formula. For such certainly less common cases, the rule basis can be used as a solution in that for the attribute of the basic function as a value the key of the rule is given which performs the complex validation.

Also with regard to a basic function a value range definition per attribute may not be adequate. A definition of value ranges across attributes is possible.

For example if attribute A assumes value A1, attribute B may only assume values B1, B2 and B3; in all other cases the value range B10 to B100 is permissible for attribute B.

Also with regard to a product template the attribute-specific definition of value ranges may not be sufficient. For the above cases i.e. for dynamic value ranges of individual attributes and for all value range checks across attributes, corresponding rules are made available via the rule basis. The rules contained therein are formulated for reusability so that as many checks as possible on different attributes, basic functions and product templates can be performed with as few rules as possible. To allow this reusability, a relationship is explicitly created between a rule and its allocated object (attribute, basic function, product template). Although a relationship can be created between each object and each rule, the following precondition applies:

For rules there is no lifecycle in the rule base. Static and dynamic rules differ. In the rule base for static rules, only the information Program name, Input/output copybook name is contained. Content mutations of rules are therefore not included in the rule basis but in the reference to program. Dynamic rules are functionally limited and only provided for prototyping purposes. The relationship between rule and product template is provided in the model as a relationship entity. Here it is possible to add or remove rules subsequently during the lifecycle of a product template without the product template itself having to be altered. To correctly depict a product template, a lifecycle is managed for this relationship so that at each time in the contract the correct i.e. current valid rule is used and processed.

Dynamic rules usually consist of an SQL statement and are prepared and executed by a driver program available for this. The convention is that for SQLCODE 0 (zero) the value OK is used and for SQLCODE 100 the value NOK, and for all other SQLCODES the value DB-ERROR (this is a special case for NOK) is returned. The rule base contains, as well as the SQL statement text, also descriptive information on the variables which must be provided for performance of the rule. In production because of the greater stability and speed, only static rules are executed. As the rule base for a rule contains the program name and input and output copybooks, for performance of static rules a general driver program can also be provided.

For validation rules the dynamic value range of an attribute should not be structured across attributes. Instead of the static value of an attribute the key of the rule is entered. This means at the same time that in this case precisely one rule is allocated to the attribute. For value range checking across attributes, for attributes of a basic function or a basic function in a product template, an explicit (n:m) relationship is generated between a basic function or a basic function in a product template and a rule of the rule base. Thus a basic function can have relationships with several rules and a rule can be used in several basic functions.

Distribution rules can be used across several attributes of a product template i.e. also across several basic functions of this product template. Thus rules can assume considerable complexity.

All the above rule types are "hard" rules i.e. they indicate whether a particular data combination can or cannot lead to a contract.

Thus it is recommended to implement distribution rules only at product template level. The definition of distribution rules at the level of the basic function greatly restricts the reusability of the basic function.

A rule is an independent object with its own identification (STID) and a descriptive text of 160 Bytes. The argument of a rule is a list of parameter values. The return values of a rule are usually OK or NOK.

In processing types of a rule we distinguish between static (which integrates a program with fixed input and output interface (copybook)) and dynamic (integrated statement text of an SQL statement with parameter markers in which the WHERE condition result are divided into SQLCODE 0=OK, SQLCODE 100=NOK and other codes=ERROR.

Figure 6:
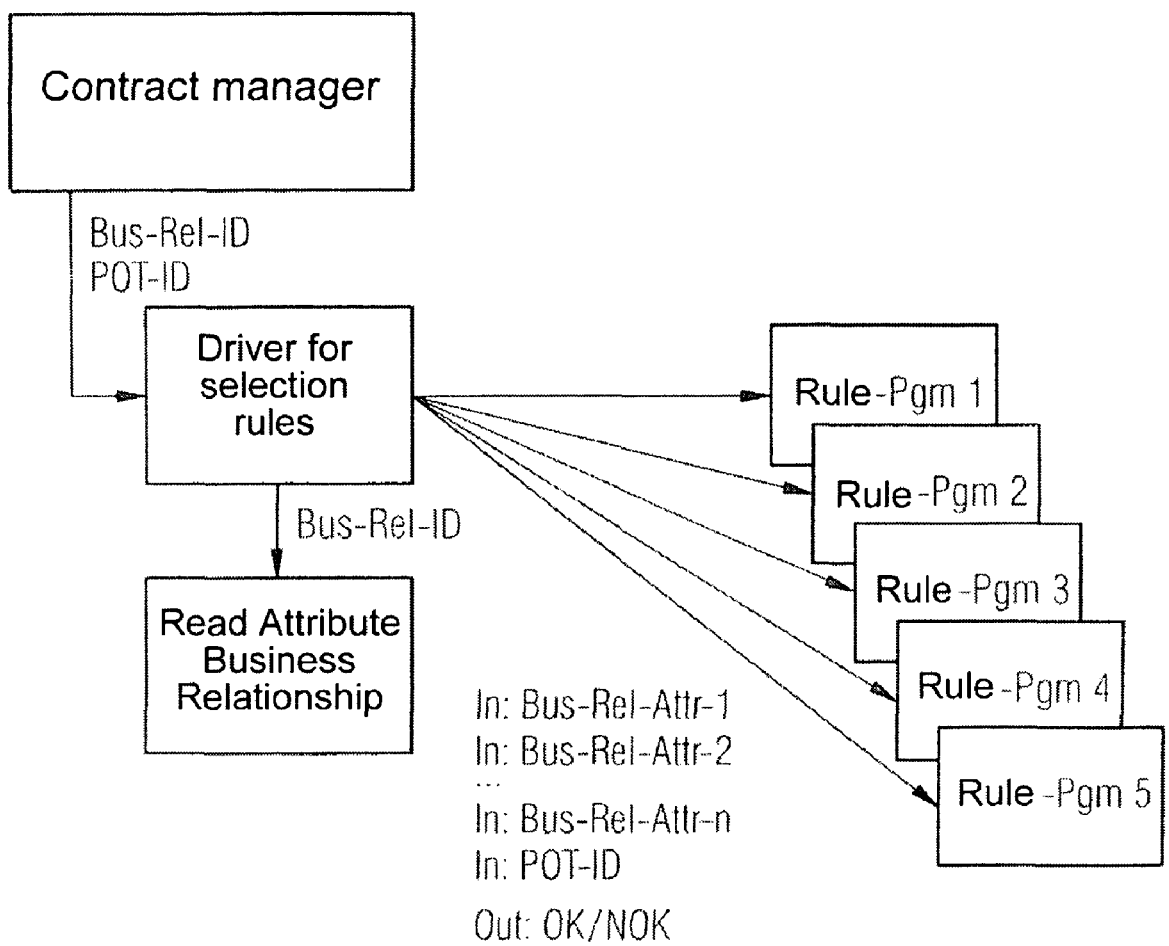
FIG. 6 shows diagrammatically the retrieval of rules by the software program component contract manager.

As FIG. 6 shows, a rule is retrieved such that the software program component contract manager can receive the rule ID and the input values for the rule e.g. from the GUI. Thus a generic rule driver is retrieved which reads the rule table. The rule is then executed statically or dynamically (static for production mode, dynamic for prototyping in development). The information on the rules in the rule table in the static case is the program name and input/output interface (=copybooks) and in the dynamic case an SQL statement text with parameter markers (spacers for variables) with for example around twenty variables, information on name, format of variables.

In a static rule all copybooks of all static rules are known to the rule driver. The transferred parameter values are transferred in the fields of the copybook. Then a retrieval takes place of the type "CALL program USING copybook-in, copybook-out". An OK or NOK is returned from the rule driver.

In a dynamic rule the parameter markers are replaced in the statement text by transmitted values. The parameter formats are known from the rule table (numeric, character, datetime, . . . ). The rule is then processed by PREPARE and EXECUTE the statement text. SQLCODE 0 gives OK, SQLCODE 100 gives NOK, otherwise DB-Error.

The distribution rules are retrieved for example if a customer/partner wishes to receive a particular service. Based on a search function, the program component contract manager has a list of POT's which contain relevant basic functions. The program component contract manager for each of these POT's retrieves a rule driver which checks the distribution suitability of the POT for the customer concerned. For this the rule driver inputs the business relationship ID and the POT ID. The output from the rule driver is then OK/NOK.

The rule driver executes the following activities: read data on business relationship ID and read rule use with POT ID. Then each rule program is retrieved with the following interface: attribute to business relationship ID, POT ID and return of rule program OK/NOK.

On the first NOK the retrieve of the rule program is interrupted and the contract manager receives NOK.

To ensure a static value range (including reference tables) no rules are required in the rule base as these have already been provided by tables for the attribute values.

The data on basic functions (BL) and product templates (POT) are managed so that each mutation of these objects can be clarified and reconstructed at any time. Mutations can have ad hoc validity in online operation. Mutations are also permitted in the future. For stability and handling considerations the current valid state of a basic function or product template is defined by convention (recommendation) as the state valid for the current date at zero hours.

As well as this principle there are the following conventions and application processes which are provided for managing basic functions and product templates:

A basic function can be mutated as follows:
Addition/removal of attributes
Change of permitted value range of attributes These mutations are triggered by the processing of software program component (basic function producer). The addition or removal of attributes is a massive intervention which occurs relatively rarely. In the same way as a change to basic function, the interface must also be adapted.

The invention claimed is:

1. A computer-implemented system for producing, processing, and managing structured data sets, the system comprising:
   a basic function configurator for defining a basic function, wherein:
      services performed in the basic function are organized hierarchically by at least one of descriptive attributes, associated values, and value ranges for processing the basic function;
      each service is depicted on data sets;
      distribution rules are allocated to the data sets; and
      the data sets and the distribution rules define the basic function;
   a basic function directory storing the data sets and the distribution rules defining the basic function in a database accessible by a product template configurator, wherein:
      the basic function in the basic function directory has at least one of the following states:
         released and active for product configuration;
         released and inactive for product configuration; and
         not released and inactive for product configuration; and
      the product template configurator combines generic basic functions from the database and transfers the generic basic functions to a product template, the generic basic functions providing specific basic functions for the product template by restrictions of values and value ranges of the attributes and defining default values of the attributes, wherein:
      the product template comprises one or more basic functions associated with a product and comprises one or more basic functions to be associated or disassociated with the product;
      the product template is supplemented with referenced conditions including at least one of central instructions, price data, and interest conditions, and the referenced conditions overrule the values and the value ranges for the attributes;
      during creation of the product template from the generic basic functions, the states of the generic basic functions are fixed to the state that was productive at the time of production of the product template;
      the product template serves as the basis for a contract relationship with a customer;
      a product template directory stores product templates in a structure accessible by a contract manager and for representation on a user interface, the contract manager being adapted to individualize a product template by adapting attributes within possible value ranges;
      a contract is formed by exchanging attributes between components involved in the contract, the components being indicated by metadata of the basic functions and the product templates; and
      the metadata of each basic function comprises structure data, and permitted value ranges of the attributes comprise the permitted business case types which are established by the components.

2. The computer-implemented system of claim 1, wherein the distribution rules comprise at least one of static distribution rules and dynamic distribution rules.

3. The computer-implemented system of claim 1, wherein the distribution rules are defined by at least one of a rule identification number, a brief description, a long description, a rule class code, and a rule type code.

4. The computer-implemented system of claim 2, wherein the static distribution rules are implemented as a computer program with at least one of standardized data input interface and standardized data output interface.

5. The computer-implemented system of claim 2, wherein the dynamic distribution rules are implemented as a computer program with a description and an implementation of at least one of dynamic rules and dynamic variables.

6. The computer-implemented system of claim 1, wherein an extension of the attributes by addition or expansion of the value ranges is excluded.

7. The computer-implemented system of claim 1, wherein the distribution rules determine which conditions are to be fulfilled so that the customer has access to the product associated with the basic function defined by the distribution rules.

8. The computer-implemented system of claim 1, wherein the distribution rules comprise at least one of an age, a domicile, a customer segment, and legal restrictions.

9. The computer-implemented system of claim 1, wherein the distribution rules cannot be overruled.

10. The computer-implemented system of claim 1, wherein the distribution rules comprises legal restrictions are transferred on product configuration.

11. The computer-implemented system of claim 1, wherein an identification number characteristic of the distribution rule is allocated to the product template.

12. The computer-implemented system of claim 1, further comprising validation rules for checking whether the values or the value ranges of the attributes are observed or whether inputs in fields are valid based on field formats.

13. The computer-implemented system of claim 12, wherein the validation rules return OK or NOK as a result.

14. The computer-implemented system of claim 1, further comprising validation rules for pre-selecting and checking product templates for which a contractual relation must be opened or modified for a customer, the validation rules returning a result set upon the checking.

15. The computer-implemented system of claim 1, further comprising validation rules for determining a default value specific to the customer before or during displaying the value on the user interface.

16. The computer-implemented system of claim 1, further comprising validation rules for checking at least one of a value, a value range, or a data set specified in the product template to ensure processability of the basic function.

17. The computer-implemented system of claim 1, wherein the service is segmented into several basic functions based on delimitable functions.

18. A computer-implemented method for producing, processing, and managing structured data sets, the method comprising:
  defining a basic function, including:
    organizing hierarchically services performed in the basic function by at least one of descriptive attributes, associated values, and value ranges for processing the basic function;
    depicting each service on data sets;
    allocating distribution rules to the data sets; and
    defining the basic function by the data sets and the distribution rules;
  storing the data sets and the distribution rules defining the basic function in a database in a basic function directory, wherein:
    the basic function in the basic function directory has at least one of the following states:
      released and active for product configuration;
      released and inactive for product configuration; and
      not released and inactive for product configuration;
  combining generic basic functions from the database and transferring the generic basic functions to a product template, the generic basic functions providing specific basic functions for the product template by restrictions of values and value ranges of the attributes and defining default values of the attributes, the product template comprising one or more basic functions associated with a product and comprises one or more basic functions to be associated or disassociated with the product;
  supplementing the product template with referenced conditions including at least one of central instructions, price data, and interest conditions, the referenced conditions overruling the values and the value ranges for the attributes;
  fixing, during creation of the product template from the generic basic functions, the states of the generic basic functions to the state that was productive at the time of production of the product template, the product template serving as the basis for a contract relationship with a customer;
  storing stores product templates in a structure in a product template directory accessible by a contract manager;
  representing the product templates on a user interface;
  individualizing a product template by adapting attributes within possible value ranges;
  indicating components by metadata of the basic functions and product templates; and
  forming a contract by exchanging attributes between the components involved in the contract;
  wherein the metadata of each basic function comprises structure data, and permitted value ranges of the attributes comprise the permitted business case types which are established by the components.

19. The computer-implemented method of claim 18, further comprising determining based on the distribution rules whether conditions are fulfilled so that the customer has access to the product associated with the basic function.

20. The computer-implemented method of claim 18, further comprising checking whether the values or the value ranges of the attributes are observed or whether inputs in field are valid based on field formats.

21. The computer-implemented method of claim 18, further comprising:
  pre-selecting and checking product templates for which a contractual relation must be opened for modified for a customer; and
  returning a result set based on the checking.

22. A computer readable medium storing instructions that, when executed by a processor, performs the method of claim 18.

* * * * *

UNITED STATES PATENT AND TRADEMARK OFFICE
CERTIFICATE OF CORRECTION

| | | |
|---|---|---|
| PATENT NO. | : 8,024,373 B2 | Page 1 of 1 |
| APPLICATION NO. | : 12/085440 | |
| DATED | : September 20, 2011 | |
| INVENTOR(S) | : Marcel Bank et al. | |

It is certified that error appears in the above-identified patent and that said Letters Patent is hereby corrected as shown below:

Title page, item (57), delete the Abstract in its entirety and insert:

--ABSTRACT

According to one embodiment, a data management system has a basic function configurator to define a generic basic function, whereby the function performed is depicted in a basic function by descriptive attributes and associated values or value ranges. The function is depicted on a data set to which a distribution rule is allocated. A data set and distribution rules define a generic basic function. The product template configurator combines and transfers several basic functions to a product template, wherein the generic basic functions are changed into specific basic functions for the product template by restricting the values. A product template comprises one or more basic functions belonging to a product. A product template with specific basic functions serves as a basis for a contractual relationship with a partner. The structure of the product template is stored in a product template list for access by a contract manager.--

Signed and Sealed this
Tenth Day of January, 2012

David J. Kappos
*Director of the United States Patent and Trademark Office*